United States Patent [19]

Larinoff

[11] 4,129,180

[45] Dec. 12, 1978

[54] VAPOR CONDENSING APPARATUS

[75] Inventor: Michael W. Larinoff, Houston, Tex.

[73] Assignee: Hudson Products Corporation, Houston, Tex.

[21] Appl. No.: 747,808

[22] Filed: Dec. 6, 1976

[51] Int. Cl.² ............................................. F28B 9/10
[52] U.S. Cl. ..................................... 165/113; 165/111
[58] Field of Search ............................. 165/110–113, 165/107 D, 71

[56] References Cited

U.S. PATENT DOCUMENTS

| 2,217,410 | 10/1940 | Howard | 165/111 |
|---|---|---|---|
| 3,306,346 | 2/1967 | Othmer | 165/110 |
| 3,429,371 | 2/1969 | Palmer et al. | 165/112 |
| 3,598,179 | 8/1971 | Giauque | 165/113 |
| 3,612,172 | 10/1971 | Dohnt | 165/111 |
| 3,789,919 | 2/1974 | Huber | 165/110 |
| 3,814,177 | 6/1974 | Harris et al. | 165/110 |
| 3,825,060 | 7/1974 | Heller et al. | 165/71 |
| 3,825,062 | 7/1974 | Heller et al. | 165/111 |
| 3,887,002 | 6/1975 | Schoonman | 165/113 |
| 3,968,836 | 7/1976 | Larinoff | 165/111 |

FOREIGN PATENT DOCUMENTS

| 677646 | 3/1930 | France | 165/112 |
|---|---|---|---|
| 44-5629 | 1969 | Japan | 165/11 |
| 125968 | 1/1920 | United Kingdom | 165/111 |
| 908429 | 10/1962 | United Kingdom | 165/111 |
| 1147148 | 4/1969 | United Kingdom | 165/111 |
| 1211969 | 11/1970 | United Kingdom | 165/111 |

Primary Examiner—Charles J. Myhre
Assistant Examiner—Sheldon Richter

[57] ABSTRACT

There is disclosed apparatus which includes an air-cooled condenser having main and vent portions for use in condensing steam or other vapors containing non-condensibles such as air at a pressure near or below atmospheric, a pot into which condensate from an outlet header for the condenser is drained, and equipment for ejecting air and other non-condensibles from the outlet header to the atmosphere.

29 Claims, 15 Drawing Figures

VAPOR CONDENSING APPARATUS

This invention relates to apparatus for use in condensing steam or other vapors which contain non-condensibles such as air at a pressure near or below atmospheric. More particularly, this invention relates to improvements in such apparatus wherein the vapor, which may be steam from a turbine exhaust, is circulated through a condenser having bundles of rows of tubes over which cooling air is passed, the condensed vapors being collected in and drained from a header at one end of the bundle, and the air and other non-condensibles in the header being vented to the atmosphere.

As cooling air is passed over the rows of tubes of the bundles, it is heated so that the difference between its temperature and that of the vapor within the tubes of each row, and thus its cooling capacity, decreases in the direction of air flow. Consequently, although the vapor is introduced into the tube rows through a common inlet header, it enters the outlet header at different pressure levels. Thus, the lowest level is that which enters from the first row to be contacted by the air flow, and the highest level is that which enters from the last row to be so contacted. As a result, when the outlet header comprises a housing common to all rows, uncondensed vapors are drawn into the first row from one or more of the succeeding rows, and, to a lesser extent, into each successive row from one or more of those succeeding it.

When such backflow occurs, pockets of air and other non-condensibles are formed in the tubes and the outlet header. This presents a serious problem when the temperature of the cooling air is below freezing, because these pockets are void of hot vapors and thus leave bare metal walls which will quickly cool down to ambient temperature, so that the condensate flowing through the tubes may freeze up and thus cause the tubes to burst.

In addition to backflowing into the tubes of certain rows, and principally into the tubes of the first row to be contacted by air since the pressure drop across them is the greatest, uncondensed vapors may also backflow from one or more tubes into other tubes in a single row. Thus, for example, if the condenser comprises tube bundles having tubes arranged horizontally and disposed as a "V", cooling air passes over a tube on one side of each bundle at a considerably greater speed over which it passes a tube in the same row on the other side thereof. Since vapor in the first such tube experiences a greater pressure drop than that in the other tube, uncondensed vapors from the outlet header may be drawn into and create pockets of non-condensibles within such first tube.

U.S. Pat. No. 3,074,479 shows a condenser in which an effort has been made to lessen the freezing problem by forming the outlet header of separate sections each connecting with one of the tube rows, and providing means for draining condensate from each section while isolating the pressure therein from that within the others. However, in prior condensers, including those having such outlet headers, uncondensed vapors including air and other non-condensibles have been collected into a single line or manifold prior to venting to suitable air removal equipment, which may include two or more stages of ejector nozzles and/or vacuum pumps which raise the pressure of the uncondensed vapor to a level at which it may be discharged to the atmosphere. As a result of this connection of the uncondensed vapors in the various tube rows with one another, some of the uncondensed steam is caused to backflow into the tubes of the first rows to be contacted by air.

U.S. Pat. No. 3,223,152 shows a tube bundle having the tubes in the different rows of a special design intended to effect equal steam condensation in all rows of tubes. However, this design is practical only under given temperature conditions. It has also been the practice to provide the condenser with a main portion of such design that the tubes of all its rows receive only the amount of steam which those of the first row are capable of condensing, and to draw off excess steam from succeeding rows to a so-called vent portion connected in series with the main condenser. Since the vent portion is of basically the same construction as the main portion, although on a smaller scale, this at most isolates the above-discussed freezing problems to only a portion of the tube bundle area. Furthermore, separate main and vent portions add to overall expense of the condenser since they require additional headers and piping between them, and involve complex controls when there are separate sources of air flow for each portion which must be maintained in proper balance.

Although U.S. Pat. No. 3,887,002 shows a condenser in which the main and vent portions are combined to some extent within the same bundle, whereby each is served by the same source of air flow and the same outlet header, the tubes of the bundle are "U" shaped and thus in two pass relation with respect to the air flow. Among other things, the "U" tubes are arranged horizontally within bundles arranged as an inverted "V", so that, as previously discussed, there is an air velocity gradient across each bundle which differs between the tubes on the top and bottom of the bundle, thereby causing backflow problems. Still further, the tubes of the bundles of the vent portion are so positioned that they are contacted by air which has not been heated by passing over other tubes through which hot vapors are circulated, thus creating potential freeze problems in an area of the condenser most susceptible to them due to the low content of hot vapor therein.

An object of this invention is to provide apparatus of this type in which freezing problems are minimized, and, more particularly, which insures one-directional flow — i.e., no backflow — of both vapor and condensate throughout the tubes and headers thereof.

Another object is to provide apparatus which includes equipment for venting air and other non-condensibles to the atmosphere without backflow into any part of the condenser.

A further object is to provide an air-cooled condenser having main and vent tube bundle portions which is more compact and less susceptible to freezing problems than prior condensers of this type.

These and other objects are accomplished, in accordance with the illustrated embodiment of the present invention, by apparatus of this type comprising a condenser having main and vent portions, each including two or more parallel rows of tubes over which air is caused to pass, with one end of the tubes of the main portion being connected to an inlet header through which steam is introduced, and the other ends of such tubes being connected to one end of the tubes of the vent portion to deliver uncondensed steam and non-condensibles thereto. The condenser also includes an outlet header having a pair of sections each connecting with the tubes of one row of the vent portion, and means for draining condensate therefrom while isolating the pressure within each section from that within the other, and a means is provided for removing uncondensed steam and non-condensibles from the opposite ends of the tubes of the vent portion, including a separate pipe connecting at one end with the vent tubes of each row, and means for discharging fluid from the other end of each pipe at a pressure which prevents backflow into any one of them.

In the preferred embodiment of the invention, the main and vent tube bundle portions of the condenser are integrated, with the interconnected ends of the tubes of each row of both portions connecting with a single outlet header section, whereby the means for draining condensate from the outlet header while isolating the pressure within each section thereof from that within the other serves both portions of the condenser. Each pipe through which uncondensed steam and non-condensibles is removed connects with the ends of the tubes of one row of the vent portion opposite to those ends connecting with the outlet header sections.

The tubes of the vent condenser portion and main condenser portion are arranged in common rows to provide the most compact arrangement possible. Preferably, the vent tubes connecting with the outlet header section for the first row of tubes of the main portion to be contacted by air extend within one of the other rows of tubes of the main portion, so that these vent tubes avoid contact by the coolest air. More particularly, in a four-row condenser, which is common in this art, the vent tubes connecting with the outlet header sections connecting with the first and second rows, as well as the third row, of tubes of the main portion extend within the third row of tubes to be contacted by air. In this manner, the vent tubes are contacted by air which is neither too cool nor too warm. The opposite ends of the vent tubes extend to a point near the inlet header of the condenser, and may either extend through the tube wall of the inlet header or to a point short thereof, and their opposite ends are connected to pipes extending from the condenser for connection with the air removal equipment.

The condenser may comprise integrated main and vent portions having two-pass tube bundles of the type previously described. In other less preferred embodiments of the invention, the condenser may comprise more conventional, separate main and vent portions, each having a separate outlet header. In any event, in accordance with the first-mentioned object of the invention, the vapors which are not condensed and the non-condensibles are received in an outlet header having separate sections each for connection with one vent tube, and a separate pipe leading to the air removal equipment connects either with the end of one vent tube opposite the end thereof connected to the outlet header, as in the preferred embodiment of the invention, or with one section of the outlet header for the vent portion, as in the less preferred embodiments.

In the condenser of the present invention, the tube bundle making up each condenser is so arranged that there is substantially the same air velocity gradient profile across the tubes of each row, so that there is no backflow from one or more tubes in each row into another tube therein. In the illustrated embodiment of the invention, this is accomplished by a pair of condensers arranged in a "V", with the source of air flow being opposite the apex of the "V", and with the tubes of the bundles of each condenser extending in a direction toward the apex.

The pipes leading from the condenser each connect with air removal equipment for discharging the uncondensed vapor and non-condensibles in that pipe to the atmosphere at a pressure which prevents backflow into the pipes. Each portion of such air removal equipment may be of conventional construction, such as ejector nozzles or air vacuum pumps, in one or more stages.

In the drawings, wherein like reference characters are used throughout to designate like parts.

Figure 1:
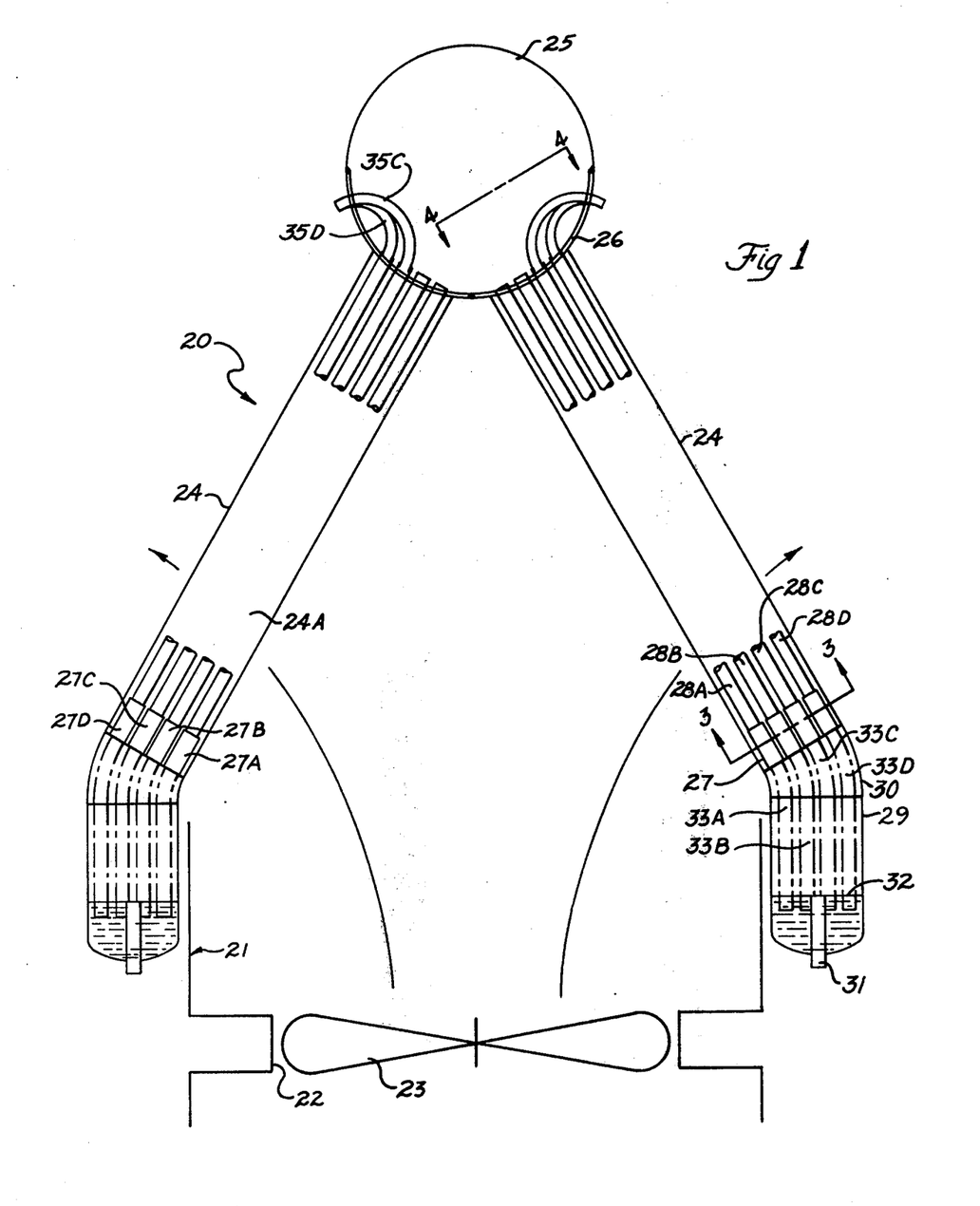
FIG. 1 is an end elevational view of the main and vent portions of a condenser constructed in accordance with the preferred embodiment of the present invention.

With reference now to the details of the above-described drawings, the condenser shown in FIG. 1, and designated in its entirety by reference character 20, comprises a housing 21 having an opening 22 therethrough, and a fan 23 disposed within the opening so as to air flow upwardly therethrough, as illustrated by the arrows of FIG. 1. A pair of bundles 24 having tubes through which steam or other vapor is circulated are arranged in an inverted "V" with its apex above the axis of rotation of fan 23 so that the air flow is split for passage over the tubes of each bundle. More particularly, both bundles 24 are connected at their upper ends to a common steam duct 25 which provides an inlet header for steam from a turbine exhaust or other subatmospheric source of vapor. As will be appreciated, additional groups of fans and bundles may be mounted along the length of the duct and thus in parallel relation to one another.

Figure 2:
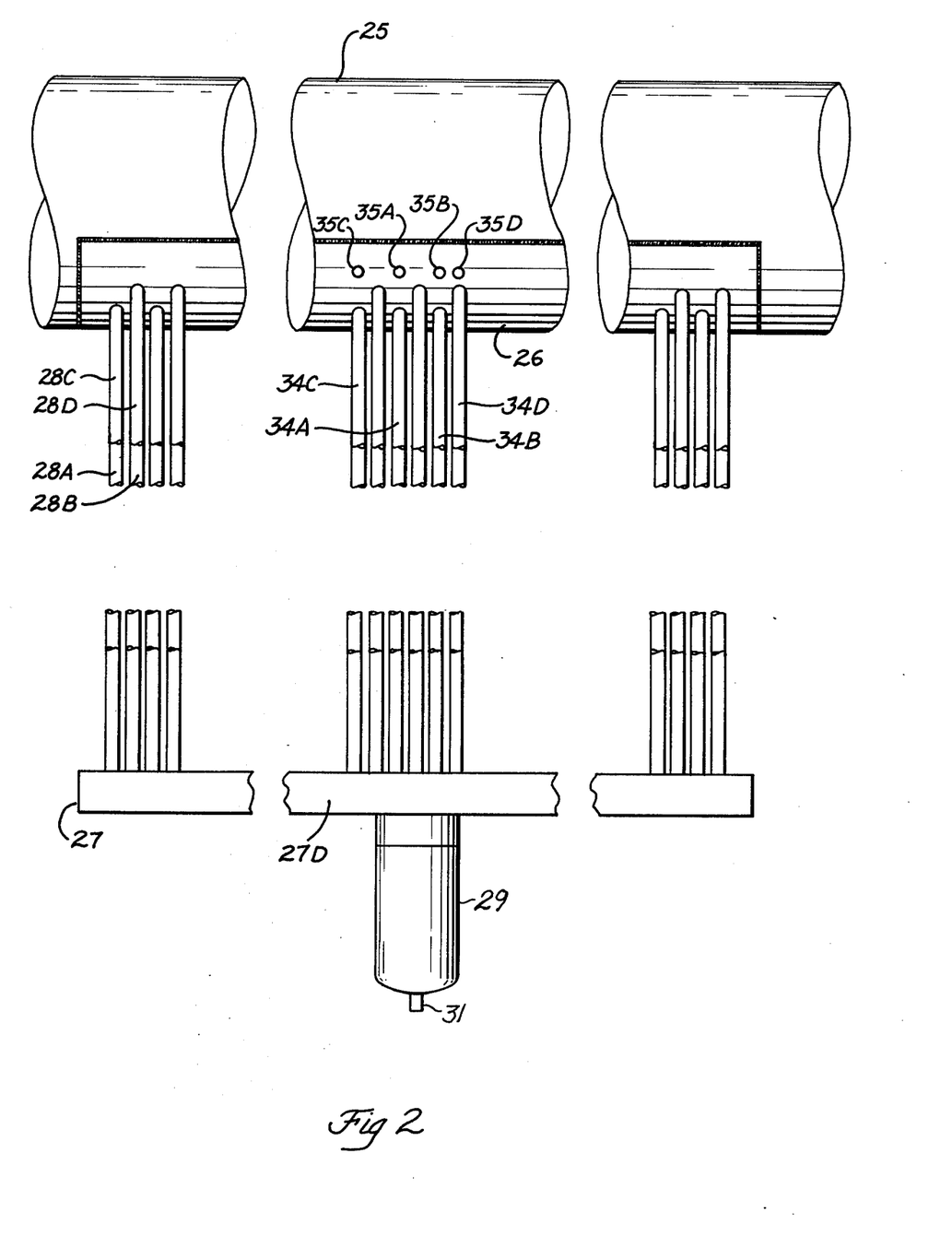
FIG. 2 is a front elevational view of the condenser of FIG. 1.
Figure 3:
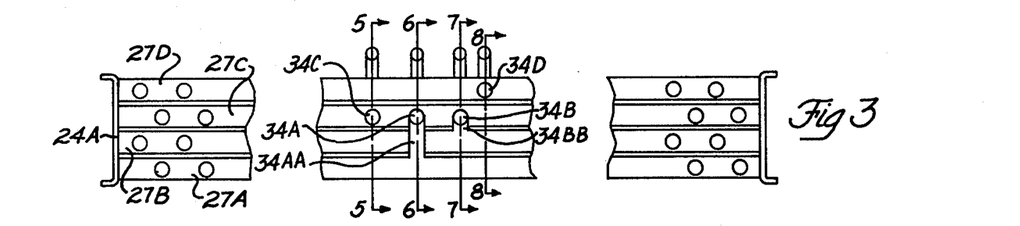
FIG. 3 is a cross-sectional view of the outlet header of one bundle of the condenser, as seen along broken lines 3—3 of FIG. 1.
Figure 4:
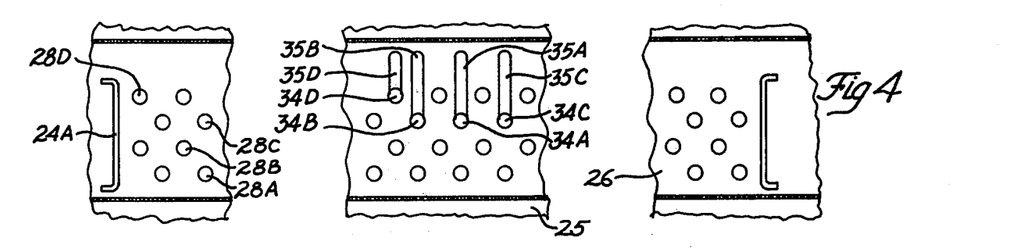
FIG. 4 is a view of the inlet header of the bundle, as seen along broken lines 4—4 of FIG. 1.
Figure 5:
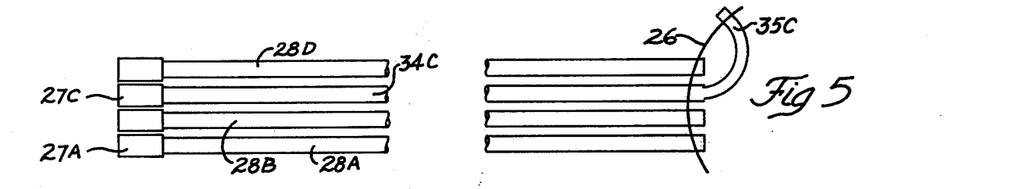
FIG. 5 is a vertical sectional view of the bundle, as seen along broken lines 5—5 of FIG. 3.
Figure 6:
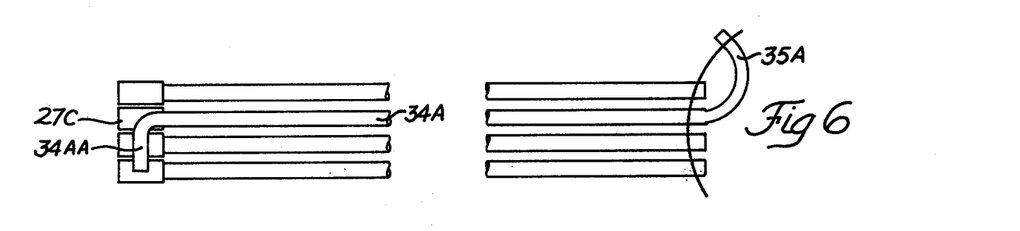
FIG. 6 is a vertical sectional view similar to FIG. 5, as seen along broken lines 6—6 of FIG. 3.
Figure 7:
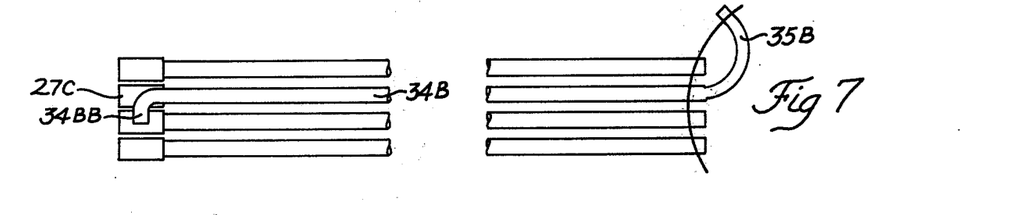
FIG. 7 is still another vertical sectional view of the bundle, as seen along broken lines 7—7 of FIG. 3.
Figure 8:
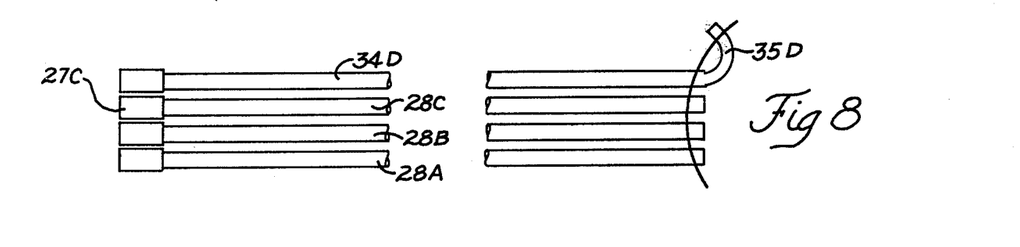
FIG. 8 is a still further vertical sectional view of the bundle, as seen along broken lines 8—8 of FIG. 3.

As shown in FIGS. 1 and 2, steam duct 25 has an opening along its lower side which is closed by curved plates 26 welded to the duct and one another. As will be described to follow, each plate also serves as the tube wall of the upper end of each bundle 24 and thus support them in the position shown.

Each bundle has a plurality of rows of tubes making up the main condenser portion and extending downwardly from the inlet header 25 for connection to an outlet header 27 on each opposite sides of fan 23. More particularly, and as can be seen from FIGS. 1 to 4, there are four parallel rows of tubes 28A, 28B, 28C and 28D arranged in direction of air flow, whereby the tubes of row 28A are the first to be contacted by air, the tubes of row 28B are the second to be contacted by air, etc.

As previously described, the air is heated as it passes over the rows of tubes so that the temperature differential between such air and the steam within the tubes of each row becomes successively less, resulting in less steam condensation and thus unequal pressure drops within the tubes of the successive rows from the inlet header to the outlet headers of each bundle. On the other hand, and as also previously described, although the velocity of the air flow passing over the tubes may vary from one end to the other, this velocity gradient, and thus the potential for condensing the steam, varies uniformly along the lengths of each tube of each row. As will further be appreciated, this same result could be obtained, by causing the air to flow in an opposite direction, by disposing the bundles in an upright "V" arrangement, disposing the tube bundles substantially horizontally and thus perpendicularly with respect to vertical air flow, or by a combination of such arrangements.

As also previously described, each outlet header 27 is made up of separate sections 27A, 27B, 27C and 27D, with section 27A being connected to the lower ends of the tubes of the first row 28A, section 27B being connected to the second row of tubes 27B, etc. As will be understood from FIGS. 2 to 4, each row may comprise a large number of laterally spaced tubes, and the tubes of adjacent rows are arranged in triangular patterns. Also, a channel 24A extends along the side of each bundle for connection at its opposite ends to the inlet and outlet headers.

Steam which condenses in the tube rows of the main condenser drains into a pot 29 having an upper extension 30 which connects with the lower end of outlet header 27. As shown in broken lines in FIG. 1, a drain pipe 31 in the lower end of the pot 29 extends upwardly therein to establish a liquid level 32 of condensate. Pipes 33 extend downwardly from the lower ends of the outlet header sections to a level beneath liquid level 32 so as to form water leg seals and thus isolate the pressure within each outlet header section from that within the others. More particularly, the tubes 33A to 33B are surrounded by the drain pot so as to insulate them from the cool atmosphere.

The vent condenser portion of each bundle 24 includes tubes 34A-34D connecting at its lower end with outlet header sections 27A-27D, respectively, and extending upwardly within one of the rows 28A-28D of main condenser portion to a point near the inlet header 25. The upper ends of these vent tubes 34A-34D are connected respectively to pipes 35A-35D leading to air removal equipment of the type to be described in connection with FIGS. 13 to 15. Consequently, and as previously described, further condensation of steam remaining in the outlet header is promoted by the same source of air flow which condenses steam in the tubes of the main condenser portion. Still further, condensate within the vent tubes is free to drain downwardly therein into the outlet header sections to which they are connected, and thus into pot 29 into which condensate in the main condenser tubes is drained.

As also previously described, and as well known in the art, the most critical area of condensers of this type is the first row of tubes to be contacted by the air. Furthermore, I have found that under freezing temperature conditions, the most ideal condensing temperature occurs in the area of the third row of tubes, the air temperature in the areas of the first and second rows normally being too cold, and the air temperature in the area of the fourth row normally being too warm. Consequently, the vent tubes 34A, 34B and 34C connecting respectively with the outlet header sections 27A, 27B and 27C extend within the third row 28C of main condenser tubes. That is, as will be apparent from the drawings, the one or more tubes required for venting each outlet header section merely take the place which would otherwise be taken by tubes in the third row 28C of main condenser portion. As shown diagrammatically in FIG. 3, a bypass 34AA within the outlet header 27 connects section 27A thereof with vent tube 34A, and bypass 34BB therein connects outlet header section 27B with vent tube 34B. Vent tube 34D, on the other hand, merely extends from outlet header section 27D within the fourth row 28D of main condenser tubes.

It should be understood, however, that this invention contemplates that, depending upon operating conditions, the vent tubes may be otherwise arranged within successive rows of main condenser tubes. For example, when ambient air temperature does not fall much below 32° F., it may be possible to eliminate the bypasses and extend vent tube 34A within row 28A, vent tube 34B within row 28B, etc. On the other hand, when ambient air temperature falls between 32° F. and minus 50° F., it may be possible to merely extend vent tube 34A in row 28B, with vent tubes 34B, 34C and 34D extending respectively within the rows 28B, 28C and 28D.

The upper ends of the vent tubes extend through the tube plate 26, and the pipes 35A-35D are bent to approximate "U" shapes and for extension back through the tube plate 26 to connect with suitable lengths of piping which leads, in a manner to be described, to the air removal equipment. As described, this preferred construction enables each bundle to be mounted on the curved plate 26 of the duct 25. In accordance with alternative embodiments, however, the upper ends of the vent tubes may be otherwise arranged, and may in fact terminate somewhat short of the upper end of each bundle and thus connect with the pipes externally of the inlet header.

As will be appreciated, the interior of drain pot 29 should be vented, and, for this purpose, a tube (not shown) extends upwardly from within the pot above water level 32 and through outlet header section 27D for extension into the lower end of vent tube 34D connecting therewith. Preferably, the drain pot is constructed in accordance with U.S. Pat. No. 3,968,836, and thus also has means for admitting steam from the outlet header into the annular space about the tubes 33A–33D within the drain pot housing. For this purpose, another pipe (not shown) may extend from one of the outlet header sections downwardly into the drain pot above the liquid level.

The condenser illustrated diagrammatically in FIGS. 9 to 11 differs from that shown and described in connection with FIGS. 1 to 8 in that the tube bundles of the main and vent portions thereof are not integrated, but instead are separate from one another. In this sense, the main purpose in showing this alternative condenser construction is to illustrate different constructions with which the air removal equipment of FIGS. 13 to 15 may be used.

Figure 9:
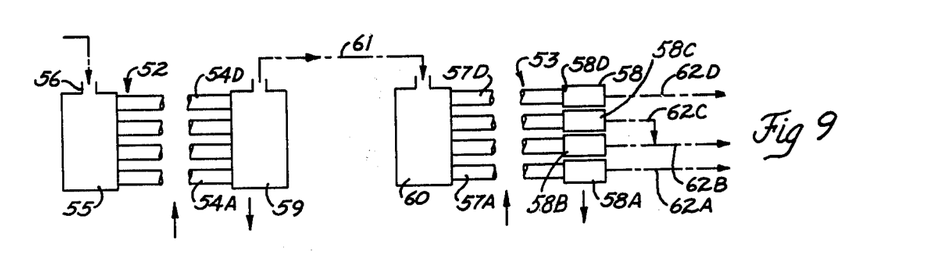
FIG. 9 is a diagrammatic front elevational view of an alternative form of condenser having separate main and vent portions connected in series and pipes extending from separate sections of an outlet header for the vent portion.

The tube bundles making up the main and vent condenser portions 52 and 53, respectively, of the condenser of FIG. 9 are similar to one another, although, as well known in the art, the vent condenser portion is normally of smaller size and capacity. Thus, the main condenser portion includes rows 54A–54D of tubes connected at their inlet ends to a common inlet condenser 55 having a port 56 through which steam is introduced. In like manner, vent condenser portion 53 is made up of rows 57A–57B of tubes having their outlet ends connected to individual sections 58A–58D, respectively, of outlet header 58, although it may be possible to combine certain of the second, third and fourth rows of tubes to be contacted by air with one another such that the vent condenser may have a lesser number of tube rows than the main condenser. With air flow from separate sources passing upwardly over the condenser portions, as shown diagrammatically in FIG. 9, the lowermost tube row in each is the first to be contacted by air, the next lowermost is the second to be contacted by air, etc.

Outlet header 59 of the main condenser portion 52 is common to all four rows 54A–54D of tubes, and inlet header 60 of the vent condenser portion is common to all rows 57A–57D of tubes thereof. Since the header 59 and 60 are common to all rows of their respective tubes, they may be connected to one another by a common pipe 61. This condenser construction is less preferred not only because of the expense of separate main and vent condenser portions, but also because it requires excess steam flow through the tubes of all rows of the main condenser portion.

The outlet header sections 58A–58D are connected to suitable means for draining condensate therefrom while isolating the pressure within each from the other. Preferably, this means may be similar to that described and illustrated in connection with the preferred embodiment of the invention of FIGS. 1 to 8. The outlet header sections 58A–58D are also connected respectively to pipes 62A–62D leading to air removal equipment to be subsequently described in connection with FIGS. 13 to 15. As shown, pipe 62C does not extend for direct connection with the air removal equipment, but instead connects with pipe 62B close to the header 58 in the interest of minimizing piping.

Figure 10:
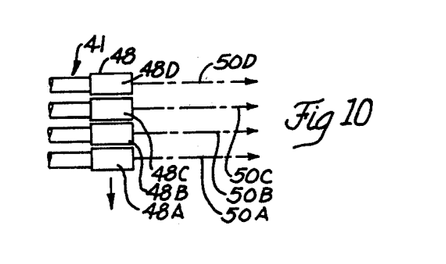
FIG. 10 is a partial view of the vent condenser portion of the condenser of FIG. 9, but with a modified arrangement of pipes extending from separate sections of an outlet header.

FIG. 10 shows one end of a vent condenser portion 41 which may be identical to the vent condenser portion 53, and thus include an outlet header 48 having separate sections 48A–48D connecting respectively with the first, second, third and fourth rows of tubes of the vent condenser portion to be contacted by air. As shown in FIG. 10, however, pipes 50A–50D extending from outlet header sections 48A–48D may extend for direct connection to the air removal equipment.

Figure 11:
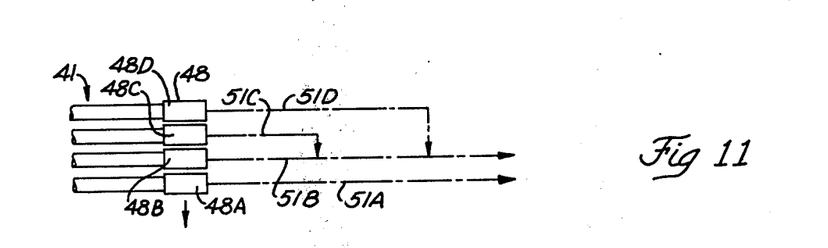
FIG. 11 is a partial view of the vent condenser portion of the condenser of FIG. 9, with another modified arrangement of pipes.

FIG. 11 shows one end of a vent condenser portion 41 identical to that of FIG. 10, but having a further modified arrangement of pipes extending from the outlet header sections 48A–48D for connection with the air removal equipment. Thus, although pipes 51A and 51B are similar to pipes 50A and 50B in that they extend directly to such equipment, pipes 51C and 51D are instead connected to pipe 51B. More particularly, pipes 51C and 51D extend for substantial distances from the outlet header sections prior to connection with pipe 51B so as to effect a pressure drop in each approximating the lower pressure in the outlet header section 48B. Consequently, the pressures of the uncondensed steam and non-condensibles which are vented by pipes 51C and 51D are approximately equal to that within pipe 51B so as to reduce the amount of piping involved without risk of backflow.

Figure 12:
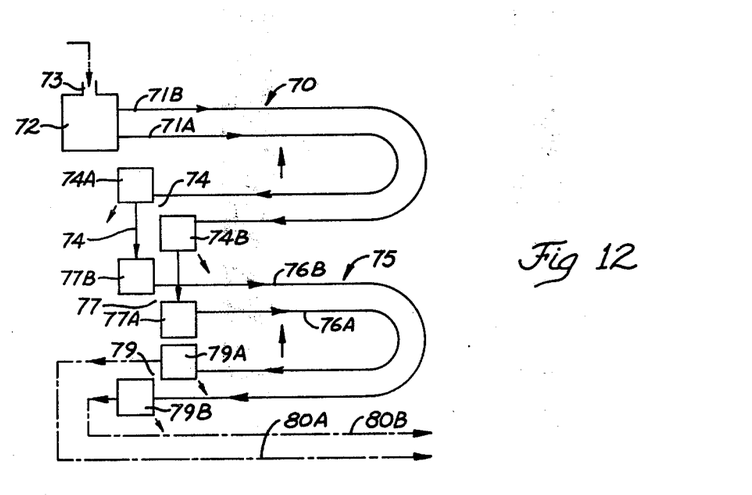
FIG. 12 is a diagrammatic illustration of yet another form of condenser having main and vent portions made up of bundles having their tubes connected in multipass fashion, and pipes extending from separate sections of an outlet header for the vent portion.

The main and vent condenser portions of the condenser shown in FIG. 12 differ from those previously described in that the tubes of the bundles making up each portion are arranged in two-pass fashion with respect to air flow. Thus, as illustrated diagrammatically in FIG. 12, main condenser portion 70 comprises a pair of rows 71A and 71B of "U" shaped tubes having their inlet ends connected to an inlet or steam header 72 adapted to receive steam through a port 73, and their opposite ends connected to the individual sections 74A and 74B of an outlet header 74. As shown diagrammatically on FIG. 12, air flow is in an upward direction over the tubes of main condenser portion 70 so that the lower legs of the tubes of row 71B are the first to be contacted by the air, the lower legs of the tubes of row 71A are the second to be contacted by the air, the upper legs of the tubes of row 71A are the third to be contacted, and the upper legs of the tubes of row 71B are the last to be contacted by air flow.

Vent condenser portion 75 is of basically the same construction as main condenser portion 70 in that it comprises a pair of rows of "U" shaped tubes 76A and 76B, with the "U"-tubes of row 76A being disposed within those of rows 76B, so that, with air flowing upwardly over the bundle from the same source as that which flows over the main condenser, the lower legs of the "U"-tubes of row 76B are the first to be contacted by air, the lower legs of "U"-tubes of the row 76A are the second to be contacted by air, the upper legs of the "U"-tubes of the row 76A are the third to be contacted by air, and the upper legs of the "U"-tubes of the row 76B are the last to be contacted by air.

As distinguished from the main condenser portion, however, the inlet ends of the "U"-tubes of 76A and 76B connect with individual sections 77A and 77B, respectively, of inlet header 77. Uncondensed steam and non-condensibles within outlet header sections 47A and 47B of the main condenser portion are connected by suitable pipes, as shown in FIG. 9, with inlet header sections 77B and 77A, respectively. Condensed steam is drained from each of the outlet header sections 74A and 74B in any suitable manner, preferably as described in connection with FIGS. 1 to 8, so as to isolate the pressure in each row of tubes of the main condenser portion from that within the other.

The outlet ends of the "U"-tubes 76A and 76B are connected to sections 79A and 79B of an outlet header 79 for the vent condenser portion, and the additional steam condensed in condenser section 79A and 79B is drained in a manner similar to that described in connection with outlet header 74. Pipes 80A and 80B extend from the vent outlet header sections 79A and 79B, respectively, so as to permit uncondensed steam and non-condensibles therein to be withdrawn by the air removal equipment to be described to follow.

As will be appreciated, the bundle of vent condenser portion 75 may comprise a lesser number of rows of "U"-tubes than that of the main condenser portion, and the rows of tubes in the vent condenser portion may be of lesser number and/or size than those of the main condenser portion. Still further, the number of pipes extending from the outlet head sections to the air removal equipment may be equal the number to the rows, or be of a lesser number by virtue of connection of the pipes for the third and/or subsequent rows with that for the second row, as shown and described in connection with FIGS. 9 and 10.

Figure 13:
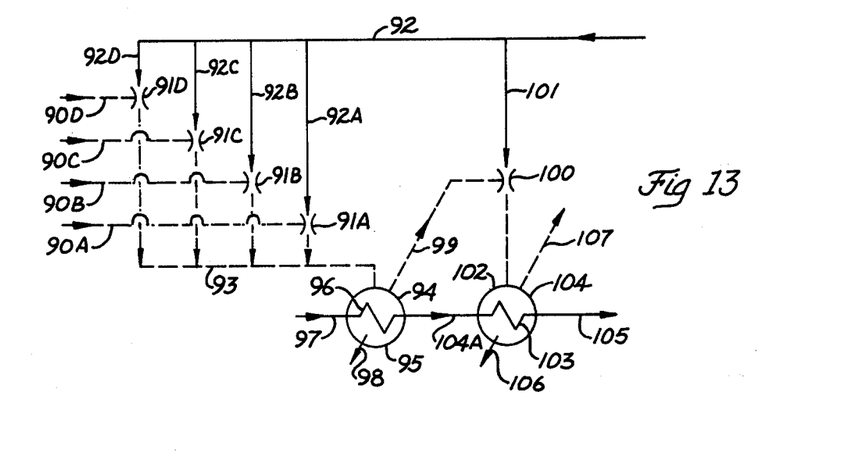
FIG. 13 is a diagrammatic illustration of one form of air removal equipment for connecting the opposite ends of the pipes extending from the condenser of FIG. 9 or similar condensers of the type above described.

The embodiment of the air removal equipment shown in FIG. 13 may be used with either the condensing apparatus of FIGS. 1 to 8 or FIG. 10, or other condensing apparatus having individual vent tubes or outlet header sections for each of four rows of tubes of the vent condenser portion. Hence, the pipes leading from such sections to the equipment are assigned reference characters 90A, 90B, 90C and 90D having no relationship to any of the previously described embodiments. In any event, it will be understood that pipes 90A-90D may connect, respectively, with 35A-35D leading from vent tubes of the vent condenser portion of FIGS. 1 to 8, or with pipes 50A-50D leading from the outlet header sections 48A-48D of vent condenser portion 41 of FIG. 10.

As shown in FIG. 13, pipes 90A-90D connect with the sides of the throats of nozzles 91A, 91B, 91C and 91D, respectively, and steam, which may be at a pressure of 150 p.s.i., is passed through branches 92A-92D of 91A-91D, respectively, for passage through the nozzles. Since the motive steam is at a considerably higher pressure than that of the essentially subatmospheric pressure of the uncondensed steam and non-condensibles within pipes 90A-90D, it draws the latter through the nozzles and ejects it into the downstream ends of the lines 92A-92D, which are connected with a common line 93 leading to an inter-condenser 94, and thereafter discharged to the atmosphere without danger of backflow into the pipes.

Inter-condenser 94 comprises a shell 95 through which a tubing 96 extends for passing cooling water therethrough from a source which leads from supply line 97. Steam condensed in the inter-condenser is drained from the shell 95 through a line 98, while uncondensed steam and non-condensibles therein are drawn through a line 99 into the side of the throat of a nozzle 100. Motive steam is supplied through another branch 101 of line 92 for passage through nozzle 100 in order to eject the uncondensed steam from the inter-condenser into an after-condenser 102.

After-condenser 102 is similar to the inter-condenser 94 in that it includes a shell 104 having a tubing 103 therein which receives cooling water from a line 104A leading from tubing 96 to circulate it through the after-condenser. Cooling water is removed from the after-condenser shell through a line 105 leading to a suitable point of disposal, while steam condensed in the after-condenser shell is drained therefrom through a line 106. The remaining uncondensed steam and non-condensibles are discharged to the atmosphere through a line 107.

Figure 14:
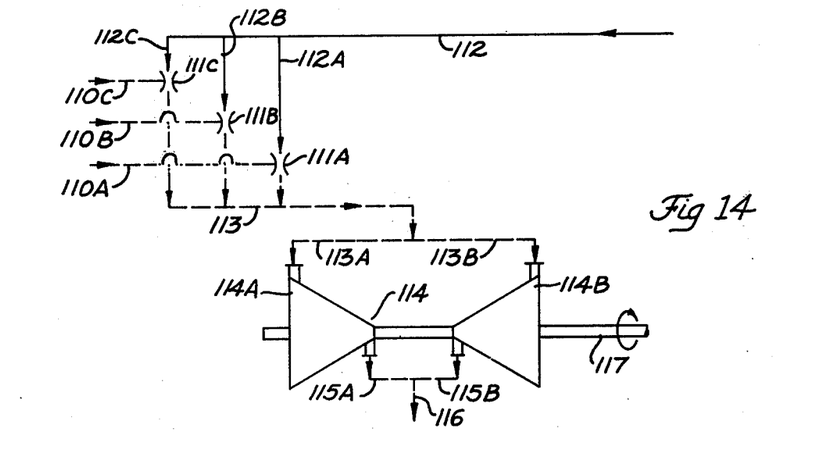
FIG. 14 is an alternative form of air removal equipment for connecting with the opposite ends of the pipes extending from the outlet header sections of FIG. 10.

The embodiment of the air removal equipment shown in FIG. 14 is adapted to be used in connection with condensing apparatus, such as that shown in FIG. 9, wherein three pipes 110A, 110B and 110C connect with pipes leading from the separate vent tubes outlet header sections, such as pipes 62A, 62B and 62D leading from the sections of outlet header 58 of FIG. 9. Pipes 110A-110C connect, respectively, with the sides of the throats of nozzles 111A, 111B and 111C, and the uncondensed steam and non-condensibles within each of the pipes is drawn into and through the nozzle by means of air supplied thereto through a line 112 having branches 112A, 112B and 112C leading, respectively, to the nozzles 111A-111C. Furthermore, as in the case of the equipment shown in FIG. 13, the uncondensed steam and non-condensibles in the pipes are ejected with the air into a common line 113 connecting with the outlet ends of lines 112A-112C and leading to a double inlet vacuum pump 114. Line 113 is split into branches 113A and 113B leading respectively to the inlets of the side 114A and 114B of pump 114. The outlets of pump sections 114A and 114B connect with lines 115A and 115B leading to a common line 116 through which any uncondensed steam and non-condensibles is discharged to the atmosphere. This pump is of the rotary type driven by means of a shaft 117.

Figure 15:
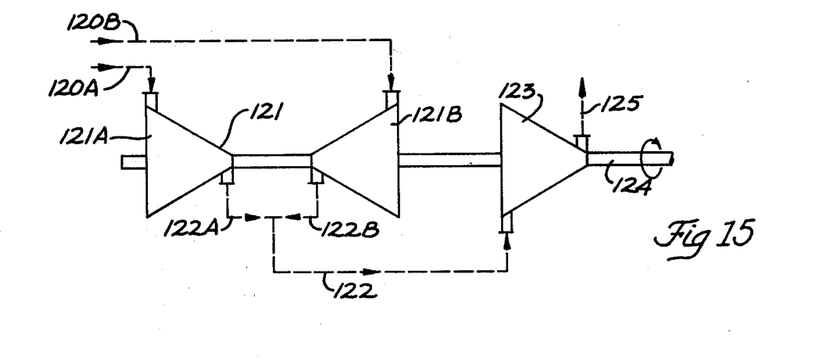
FIG. 15 is still another form of air removal equipment for connecting with the pipes extending from the outlet header sections of the condensers of FIGS. 11 and 12.

The air removal equipment illustrated in FIG. 15 may be used, for example, with condensing apparatus having two pipes, such as that shown in FIGS. 11 and 12 wherein two pipes extend from the outlet header sections of the vent condenser portion. Again, however, it would be understood that these pipes, which are indicated by reference characters 120 and 120A, may instead extend from separate vent tubes or outlet header sections of other condensing apparatus. In any event, as compared with the equipment of FIG. 14, pipes 120A and 120B lead directly to the inlets of left and right hand sides 121A and 121B of a doublt inlet vacuum pump 121. The uncondensed steam and non-condensibles discharged from the outlets of the pump sections pass through lines 122A and 122B into a common line 122 leading to the second stage vacuum pump 123. This latter pump as well as the two stage pump 121 may be of a rotary type driven by common shaft 124. Uncondensed steam and non-condensibles are discharged from the second stage pump to the atmosphere through a line 125 leading from its outlet.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. Apparatus for condensing steam or other vapor which contain non-condensibles such as air at a pressure near or below atmospheric, comprising a condenser having a main portion including a pair of parallel rows of tubes over which air is caused to pass successively, an inlet header for introducing steam into one end of the tubes of the main condenser portion, a vent portion having a pair of parallel rows of tubes over which air is caused to pass successively, one end of the tubes of the vent condenser portion being connected to the opposite ends of the tubes of the main condenser portion so as to receive uncondensed steam and non-condensibles therefrom, an outlet header including a pair of sections each connecting with the tubes of only one row of the vent condenser portion, means for draining condensate from the outlet header while isolating the pressure within each section thereof from that within the other, and means for removing uncondensed steam and non-condensibles from the opposite ends of the tubes of the vent condenser portion, including a separate pipe connecting at one end with only the tubes of each row of said vent condenser portion, and means for discharging fluid from the other end of each pipe at a pressure which prevents backflow into the pipes.

2. Apparatus of the character defined in claim 1, wherein each outlet header section connects with the interconnected ends of the tubes of one row of the main and vent condenser portions.

3. Apparatus of the character defined in claim 2, wherein the tubes of the vent condenser portion and main condenser portion are arranged in common rows.

4. Apparatus of the character defined in claim 1, wherein each separate section of said outlet header connects to the opposite ends of the tubes of one row of said vent condenser portion, and there is another outlet header to which the ends of the tubes of the main condenser portion are connected, another inlet header connected to the end of the tubes of the vent condenser portion, and means are provided for connecting said other outlet head to said other inlet header and withdrawing condensate from said other outlet header.

5. Apparatus of the character defined in claim 4, wherein the outlet header of the main condenser portion and the inlet header of the vent condenser portion is common to both rows of each.

6. Apparatus of the character defined in claim 4, wherein the tubes of each condenser are arranged in single pass relation to the air flow.

7. Apparatus of the character defined in claim 4, wherein said other outlet header also has sections each connected to the opposite end of the tubes of one row of the main condenser portion, said means for draining condensate from said other outlet head also includes means for isolating the pressure within each section of said other outlet header from that within the other, and said other inlet header also has separate sections each connected to the tubes of one row of the vent condenser portion and to a separate section of the other outlet header.

8. Apparatus of the character defined in claim 7, wherein the tubes of each condenser are arranged in multi-pass relation to the air flow.

9. A tube bundle, comprising a main portion including a pair of parallel rows of tubes over which air is caused to pass successively, an inlet header for introducing steam into one end of the tubes of the main portion, an outlet header having a first section connecting with the opposite ends of the tubes at only one row of the main portion, and a second section connecting with the opposite ends of the tubes of only the other row of the main portion, and means for draining condensate from each section of the outlet header while isolating the pressure therein from that within the other, and a vent portion including a pair of vent tubes, each vent tube connecting at one end with one outlet header section and extending within one of the rows of tubes of the main portion for connection at its opposite end to an individual pipe near the inlet header.

10. Apparatus of the character defined in claim 9, wherein the means for draining condensate includes a drain pot connected to the outlet header, an outlet tube extending into the pot to maintain a condensate level therein, a tube extending from each outlet header section into the drain pot below the liquid level, and a vent line extending from within the pot above the liquid level into the end of one of the vent tubes.

11. Apparatus for condensing steam or other vapor which contains non-condensibles such as air at a pressure near or below atmospheric, comprising a housing having an opening through which air is caused to flow, a tube bundle comprising a main condenser portion including a pair of parallel rows of tubes arranged successively in the path of the air flow, the tubes of each row extending in a direction relative to the direction of air flow such that the velocity gradient profile of the air is substantially the same over the lengths of each of them, an inlet header for introducing steam into one of the tubes of the main portion, an outlet header having a first section connecting with the opposite ends of the tubes of only one row of the main portion, and a second section connecting with the opposite ends of the tubes of only the other row of the main portion, and means for draining condensate from each section of the outlet header while isolating the pressure therein from that within the other, and a vent portion including a pair of vent tubes, each vent tube connecting at one end with one outlet header section and extending within one of the rows of tubes of the main portion for connection at its opposite end to an individual pipe near the inlet header.

12. Apparatus of the character defined in claim 11, wherein there are a pair of tube bundles arranged as a "V", and the housing opening through which air flows is opposite the apex of the "V".

13. Apparatus of the character defined in claim 12, wherein the "V" is inverted and the inlet headers for both bundles are within a common duct.

14. A tube bundle, comprising a main portion including a pair of parallel rows of tubes over which air is caused to pass successively, an inlet header for introducing steam into one end of the tubes of the main portion, an outlet header having a first section connecting with the opposite ends of the tubes of only one row of the main portion, and a second section connecting with the opposite ends of the tubes of only the other row of the main portion, and a vent portion including a pair of vent tubes, each vent tube connecting at one end with one outlet header section and extending within one of the rows of tubes of the main portion to a point near the inlet header.

15. Apparatus of the character defined in claim 14, wherein the inlet header includes a tube wall through which the ends of the main and vent portions extend, and pipes connecting with said ends of the vent tubes and passing through said wall to one side of said ends.

16. A bundle of the character defined in claim 14, wherein the vent tubes connecting with both outlet header sections extend within the row of tubes of the main portion which is the second to be contacted by the air flow.

17. A tube bundle, comprising a main portion including three parallel rows of tubes over which air is caused to pass successively, an inlet header for introducing steam into one end of the tubes of the main portion, an outlet header having a first section connecting with the opposite ends of the tubes of only the first row of the main portion to be contacted by the air, a second section connecting with the opposite ends of the tubes of only the second row of the main portion to be contacted by the air, and a third section connecting with the opposite ends of the tube of only the third row of the main portion to be contacted by the air, and a vent portion including a pair of vent tubes, each vent tube connecting at one end with one outlet header section and extending within said third row of tubes.

18. A tube bundle, comprising a main portion including four parallel rows of tubes over which air is caused to pass successively, an inlet header for introducing steam into one end of the tubes of the main portion, an outlet header having a first section connecting with the opposite ends of the tubes of only the first row of the main portion to be contacted by the air, and a second section connecting with the opposite ends of the tubes of only the second row of the main portion to be contacted by the air, a third section connecting with the opposite ends of the tubes of only the third row of the main portion to be contacted by the air, and a fourth section connecting with the opposite ends of the tubes of only the fourth row to be contacted by the air, and a vent portion including a pair of vent tubes, each vent tube connecting at one end with each outlet header section, the vent tube connecting with the first, second and third outlet header sections extending within the third row of the main portion, and the vent tube connecting with the fourth outlet header section extending within the fourth row of the main portion.

19. For use with apparatus for condensing steam or other vapor which contains non-condensibles such as air at a pressure near or below atmospheric, and which includes a condenser having a pair of parallel rows of tubes through which the vapor flows and over which air is caused to pass successively, an outlet header having a pair of sections each connecting with one end of the tubes of only one row, and means for draining condensate from each outlet header section while isolating the pressure therein from that within the other; improved equipment for removing uncondensed vapor and other non-condensibles from the outlet header sections, comprising a pair of separate pipes each connectible at one end with the opposite ends of the tubes of only one outlet header section, a first stage having means connectible with the other end of each pipe for suctioning the uncondensed vapor and other non-condensibles from the outlet header section and discharging them into a common line at a pressure intermediate said subatmospheric pressure and ambient pressure, and a second stage having means connectible with the common line for suctioning the uncondensed vapor and non-condensibles therefrom and discharging them to the atmosphere at a pressure above ambient.

20. Improved equipment of the character defined in claim 19, wherein said condenser has a third row of parallel tubes, the outlet header has a third section connecting with one end of the tubes of the third row, and said improved equipment also includes a third pipe connectible at one end with the opposite ends of the tubes of the third row, or with the outlet header section to which they connect, and said other end of the third pipe is connected to the second pipe of the pair of pipes over which air is caused to pass upstream of said first stage.

21. Improved equipment of the character defined in claim 19, wherein said first stage includes vacuum pump means having a pair of inlets each connected to the other end of one of the pipes and a pair of outlets each connected with said common line.

22. Improved equipment of the character defined in claim 21, wherein said second stage includes vacuum pump means having an inlet connecting with common line and an outlet leading to the atmosphere.

23. Improved equipment of the character defined in claim 19, wherein said first stage has a pair of ejector nozzles each having a throat in its side to which the other end of one of said pipes is connected, means for passing a motive fluid through each nozzle at a pressure substantially higher than that within each pipe, and means connecting the outlets of the nozzles to said common line.

24. Equipment of the character defined in claim 23, wherein the motive fluid passing through the nozzles is steam.

25. Equipment of the character defined in claim 24, including means intermediate the first and second stages for condensing steam in said common line.

26. Equipment of the character defined in claim 25, wherein said second stage includes an ejector nozzle through which motive steam is also passed and having a throat in its side to which the common line is connected, and a single line leading from the outlet of the nozzle to the atmosphere.

27. Equipment of the character defined in claim 26, including means in said single line for condensing steam therein.

28. Equipment of the character defined in claim 23, wherein the motive fluid passed through the nozzles is air.

29. Equipment of the character defined in claim 28, wherein the second stage includes vacuum pump means having inlets each connected to the common line and outlets each connecting with another common line leading to the atmosphere.

* * * * *